US009683626B2

(12) United States Patent
Verhoog et al.

(10) Patent No.: US 9,683,626 B2
(45) Date of Patent: Jun. 20, 2017

(54) TORSION DAMPING DEVICE COMPRISING PENDULAR FLYWEIGHTS AXIALLY OFFSET IN RELATION TO GUIDE WASHERS

(75) Inventors: Roel Verhoog, Gournay sur Aronde (FR); Lionel Renier, Villiers Bretonneux (FR)

(73) Assignee: Valeo Embrayages (FR)

( * ) Notice: Subject to any disclaimer, the term of this patent is extended or adjusted under 35 U.S.C. 154(b) by 473 days.

(21) Appl. No.: 14/125,780

(22) PCT Filed: Apr. 25, 2012

(86) PCT No.: PCT/FR2012/050918
§ 371 (c)(1),
(2), (4) Date: Mar. 18, 2014

(87) PCT Pub. No.: WO2012/172225
PCT Pub. Date: Dec. 20, 2012

(65) Prior Publication Data
US 2014/0194213 A1 Jul. 10, 2014

(30) Foreign Application Priority Data
Jun. 14, 2011 (FR) ...................................... 11 55180

(51) Int. Cl.
*F16F 15/123* (2006.01)
*F16H 45/02* (2006.01)
(Continued)

(52) U.S. Cl.
CPC .......... *F16F 15/12353* (2013.01); *F16D 3/12* (2013.01); *F16F 15/12373* (2013.01);
(Continued)

(58) Field of Classification Search
CPC .... F16F 3/12; F16F 15/1202; F16F 15/12353; F16F 15/12373; F16F 15/13128;
(Continued)

(56) References Cited

U.S. PATENT DOCUMENTS 8,342,306 B2 * 1/2013 Werner ............. F16F 15/12353
192/3.3
8,739,523 B2 * 6/2014 Huegel ............. F16F 15/13128
192/30 V
2010/0269497 A1 10/2010 Engelmann et al.

FOREIGN PATENT DOCUMENTS

DE 102009021355 A1 * 12/2009 ........ F16F 15/13128
DE 102009030971 A1 * 1/2010 ............... F16D 3/14
(Continued)

OTHER PUBLICATIONS

"Welding Basics." Welding Information Center. Nov. 3, 2010, [online], [retrieved on Feb. 24, 2016] Retrieved from the Internet <URL: http://web.archive.org/web/20100311010626/http://www.weldinginfocenter.com/basics/ba_02.html>.*
(Continued)

*Primary Examiner* — Josh Skroupa
(74) *Attorney, Agent, or Firm* — Berenato & White, LLC

(57) ABSTRACT

A torsion damping device (10) equipped with first torsion damping system that comprise a radial phase washer (38) and two guide washers (20A, 20B) and elastic members (36); the damping device being equipped with second torsion 5 damping system that have two pendulum flyweights (54A, 54B) that are mounted oscillatingly on a support element (56) that is rotationally integral with the phase washer (38); wherein the support element (56) is offset axially with respect to the guide washers (20A, 20B) in such a way that the two pendulum flyweights (54A, 54B) are offset axially on the same side with respect to the two guide washers (20A, 20B).

13 Claims, 6 Drawing Sheets

(51) Int. Cl.
*F16F 15/14* (2006.01)
*F16D 3/12* (2006.01)

(52) U.S. Cl.
CPC ........... *F16F 15/145* (2013.01); *F16H 45/02* (2013.01); *F16H 2045/0263* (2013.01)

(58) Field of Classification Search
CPC .. F16F 15/13469; F16F 15/14; F16F 15/1407; F16F 15/145; F16F 15/1457; F16D 3/12; F16H 45/02; F16H 2045/0263
USPC ..... 464/68.1, 68.2; 192/3.28–3.3, 30 V, 201, 192/212; 74/574.2; 60/338
See application file for complete search history.

(56) References Cited

FOREIGN PATENT DOCUMENTS

| DE | 102009042825 A1 | * | 5/2010 | ........ F16F 15/13114 |
|----|----|----|----|----|
| DE | 102009002481 | | 6/2010 | |
| DE | 102008057648 | | 6/2013 | |
| EP | 1780434 | | 5/2007 | |

OTHER PUBLICATIONS

"What Is a Rivet?" eHow. Kennedy, Robert. Dec. 15, 2010, [online], [retrieved on Feb. 24, 2016] Retrieved from the Internet <URL: https://web.archive.org/web/20101215101805/http://www.ehow.com/about_5541217_rivet.html>.*

* cited by examiner

TORSION DAMPING DEVICE COMPRISING PENDULAR FLYWEIGHTS AXIALLY OFFSET IN RELATION TO GUIDE WASHERS

CROSS-REFERENCE TO RELATED APPLICATIONS AND CLAIM TO PRIORITY

This application is a national stage application of International Application No. PCT/FR2012/050918 filed Apr. 25, 2012, which claims priority to French Patent Application No. 1155180 filed Jun. 14, 2011, of which the disclosures are incorporated herein by reference and to which priority is claimed.

FIELD OF THE INVENTION

The invention relates to a torsion damping device between an axially oriented coaxial drive shaft and driven shaft in an automotive temporary coupling system, comprising first damping means using elastic members, and second damping means using pendulum flyweights.

The invention relates more particularly to a torsion damping device between an axially oriented coaxial drive shaft and driven shaft in an automotive temporary coupling system, the device being equipped with first torsion damping means that have:
- a torque input element and a torque output element mounted rotatably around an axis coaxial with that of the shafts;
- at least two circumferentially acting elastic members that are interposed circumferentially in series between the input element and the output element;
- two radial guide washers that are arranged axially on either side of the elastic members and that have axial retention means for the elastic members, the guide washers having a peripheral portion that extends radially outward from the axial retention means;
- at least one radial phase washer that is freely rotatable with respect to the input element and with respect to the output element, the phase washer having at least one radial phasing tab that is interposed circumferentially between the two elastic members in series, the damping device being equipped with second torsion damping means that have:
- at least one pendulum flyweight that is mounted oscillatingly in a radial plane on a support element that is rotationally integral with the phase washer.

BACKGROUND OF THE INVENTION

Damping devices of this type are, for example, part of dry or wet friction clutch installations, or also of clutch installations intended to lock up a hydrodynamic converter.

A combustion engine exhibits irregularities due to the succession of combustion events in the engine cylinders. Torsion damping means allow these irregularities to be filtered before engine torque is transmitted to a transmission. This is because the vibrations must be damped before they enter the transmission and produce unacceptably troublesome noise.

To accomplish this, it is known to interpose a torsion damping device between the engine shaft and the transmission shaft. The torsion damping device is generally arranged in a clutch system that allows temporary rotational connection of the engine shaft to the transmission shaft.

The torsion damping device generally has first damping means that act by interposition of circumferentially acting elastic members between a torque input element and a torque output element.

Such first damping means are advantageously supplemented by second damping means using pendulum flyweights. These pendulum flyweights, also called "pendulum oscillators," extend around the rotation axis of the drive shaft and are free to oscillate around a notional axis substantially parallel to the rotation axis of the engine shaft. When the pendulum masses react to rotational inconsistencies, they oscillate in such a way that the center of gravity of each of said pendulum masses oscillates around an axis substantially parallel to the rotation axis of the engine shaft. The radial position of the center of gravity of each pendulum mass with respect to the rotation axis of the engine shaft, as well as the distance of said center of gravity with respect to the notional oscillation axis, are established so that in response to centrifugal forces, the oscillation frequency of each of the pendulum masses is proportional to the rotation speed of the engine shaft; said multiple can assume, for example, a value close to the preponderant harmonic order of the vibrations responsible for strong rotational inconsistencies.

In devices of the existing art, the pendulum flyweights are generally located radially above the first damping means. In this case the radial dimension of the pendulum flyweights is necessarily limited, so as not to decrease too greatly the installation diameter of the elastic members, and thus decrease the efficiency of the first damping means. Because of these dimensional constraints, in the existing art the mass of the pendulum flyweights can therefore be increased only to the detriment of the efficiency of the damping means having elastic members.

A damping device of this kind is thus more efficient when the mass of the flyweights is increased.

SUMMARY OF THE INVENTION

The invention proposes a damping device of the kind described previously, wherein the support element is offset axially on the same side with respect to the peripheral portions of the two guide washers, in such a way that the pendulum flyweight is offset axially on the same side with respect to the peripheral portions of the two guide washers.

For a given dimension, the mass of the flyweights, and consequently their efficiency as well as the efficiency of the elastic-spring damping means, can thus be increased.

According to other characteristics of the invention:
- the second damping means have at least one pair of flyweights that are arranged axially oppositely on either side of the support element, the axial offset of the support element being implemented in such a way that the two flyweights are axially offset on the same side of the peripheral portions of the two guide washers;
- the guide washers constitute torque input elements;
- the radially inner terminal edge of the flyweights is arranged with respect to the rotation axis at a radial distance that is less than the radial dimension of the assemblage constituted by the input element and the output element;
- the support element is embodied integrally with the phase washer;
- the support element is an added part that is fastened to the phase washer;

the phase washer has at least one peripheral arm that extends at least partially in the axial direction in order to allow the axial offset of the support element;

the axial arm is arranged radially externally with respect to the elastic members;

the support element is fastened to the phase washer by riveting;

the support element is fastened to the phase washer by welding;

the phasing tab has rims for radially retaining the elastic members, the rims being carried by an added part that is fastened onto the phase washer;

the support element is in the form of a ring that extends in a radial plane.

The invention also relates to a torque converter having a splined torque input hub that is rotationally integral with the torque input element, the converter being equipped with a damping device implemented according to the teaching of the invention, wherein at least one flyweight is arranged radially opposite the splined hub.

BRIEF DESCRIPTION OF THE DRAWINGS

Other characteristics and advantages of the invention will become evident upon reading the detailed description that follows, an understanding of which may be gained by referring to the attached drawings in which.

DETAILED DESCRIPTION

The following orientations will be used, in non-limiting fashion, for the description hereinafter:

"axial": oriented from back to front along a rotation axis "B" of a damping device, and indicated by arrow "A" of the Figures;

"radial": oriented orthogonally to the rotation axis of the damping device from inside to outside moving away from said axis;

"circumferential": oriented orthogonally to the axis of the damping device and orthogonally to the radial direction.

For the remainder of the description, elements having similar, identical, or analogous functions will be labeled with the same reference numbers.

Figure 1:
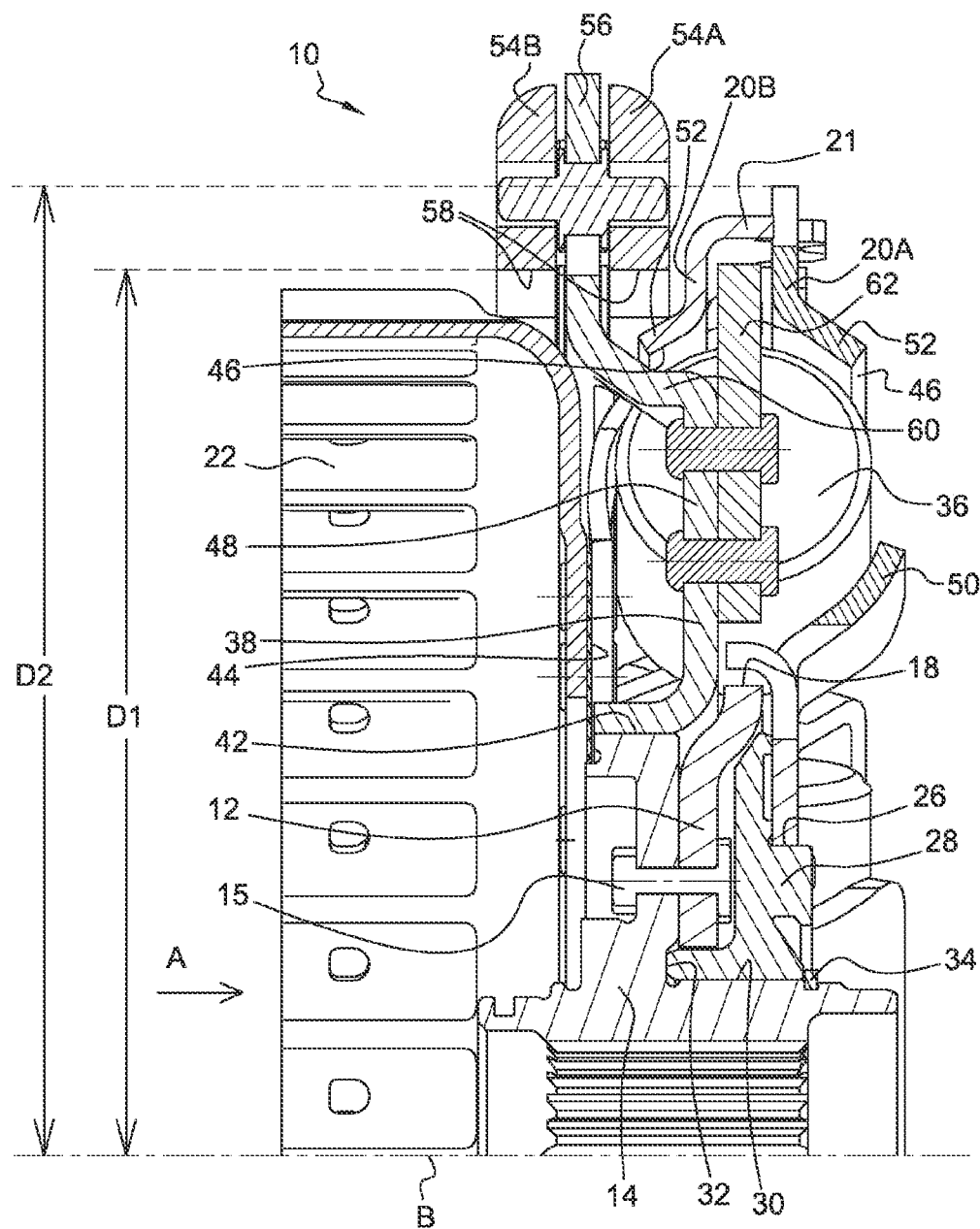
FIG. 1 is an axially sectioned view depicting a damping device implemented in accordance with a first embodiment of the invention.
Figure 4:
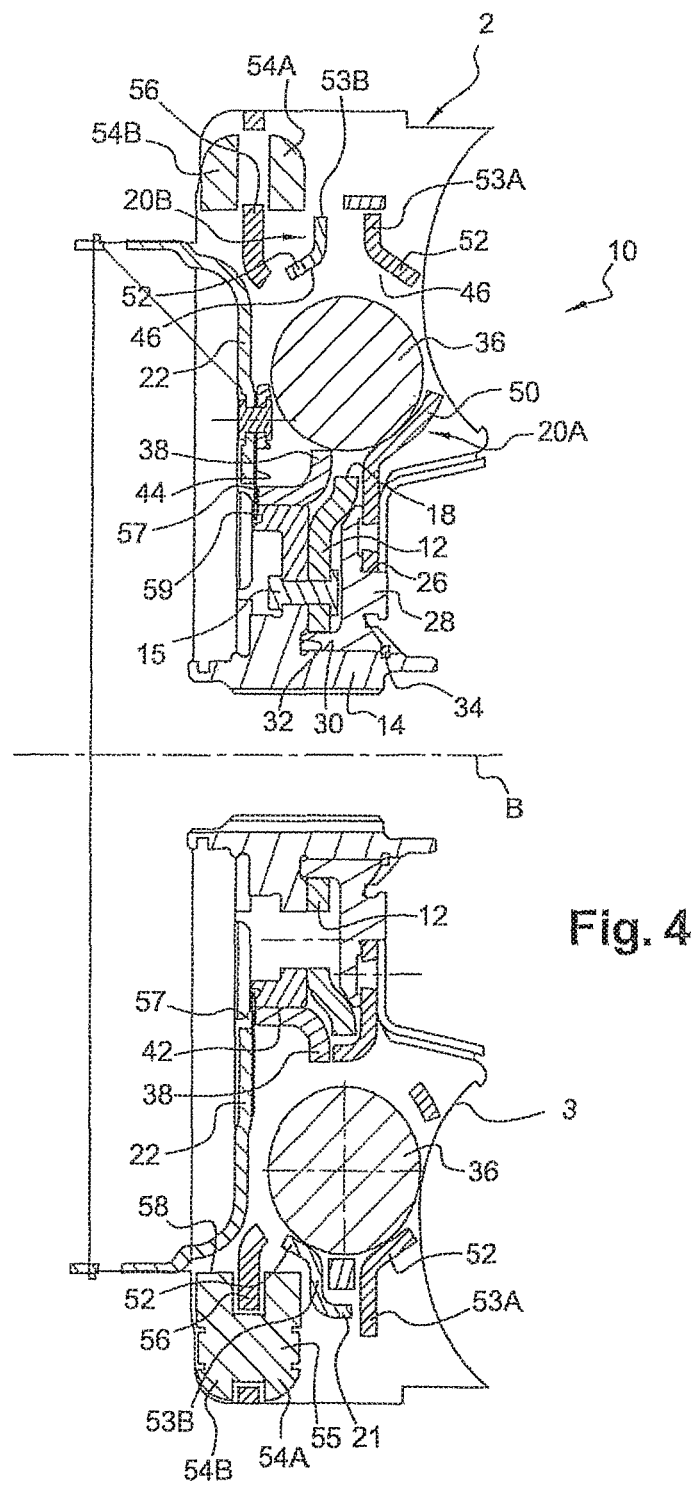
FIG. 4 is an axial view in section through the elastic members, depicting the damping device of FIG. 1.
Figure 5:
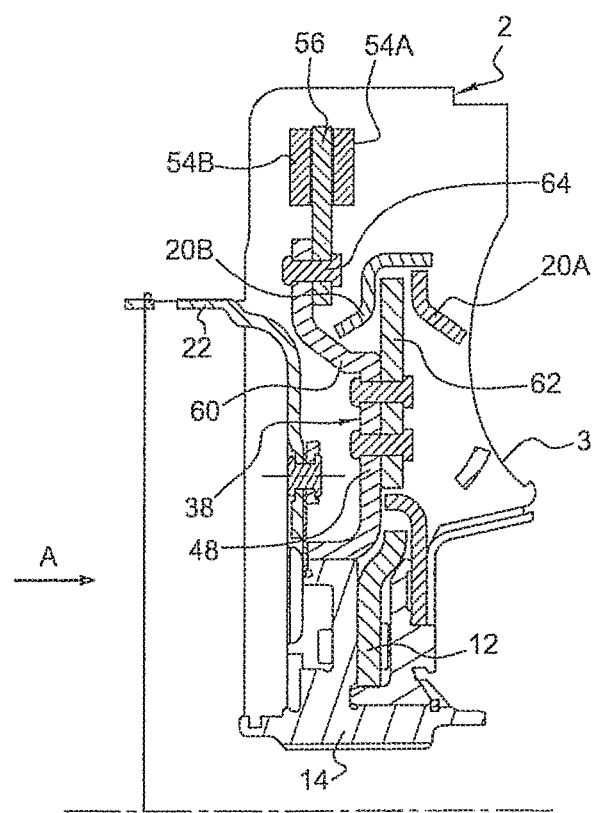
FIG. 5 is a sectioned view similar to that of FIG. 1, depicting a second embodiment of the invention.

FIG. 1 depicts a torsion damping device 10 implemented according to a first embodiment of the invention. The torsion damping device 10 is intended to be arranged in an automotive temporary coupling system. The torsion damping device 10 is intended here to be arranged in a torque converter 2 (a turbine 3 of the torque converter 2 is shown in FIGS. 4 and 5) in order to couple a torque converter housing to a locking clutch of the torque converter 2 with torque damping.

Torsion damping device 10 embodied according to the teaching of the invention is also applicable to any other type of clutch system.

The torsion damping device 10 allows coupling of a first, driving shaft (not depicted) and a second, driven shaft (not depicted), coaxial with a rotation axis "B" of the torsion damping device 10, with torsion damping.

As depicted in FIG. 1, the damping device 10 has a torque output element that is rotatable around the rotation axis "B". The torque output element includes a radial output web 12 coaxial with the rotation axis "B". The output web 12 is in the shape of a circular washer coaxial with the rotation axis "B".

Output web 12 is intended to be rotationally linked to the second, driven shaft by means of a driven hub 14. Output web 12 is rotationally linked to driven hub 14 by means of rivets 15.

Output web 12 has three radial tabs (not depicted). The tabs are arranged evenly around axis "B", globally 120° from one another. Each tab extends in radially protruding fashion with respect to outer peripheral edge 18 of output web 12. Outer peripheral edge 18 is visible in FIG. 1.

Figure 2:
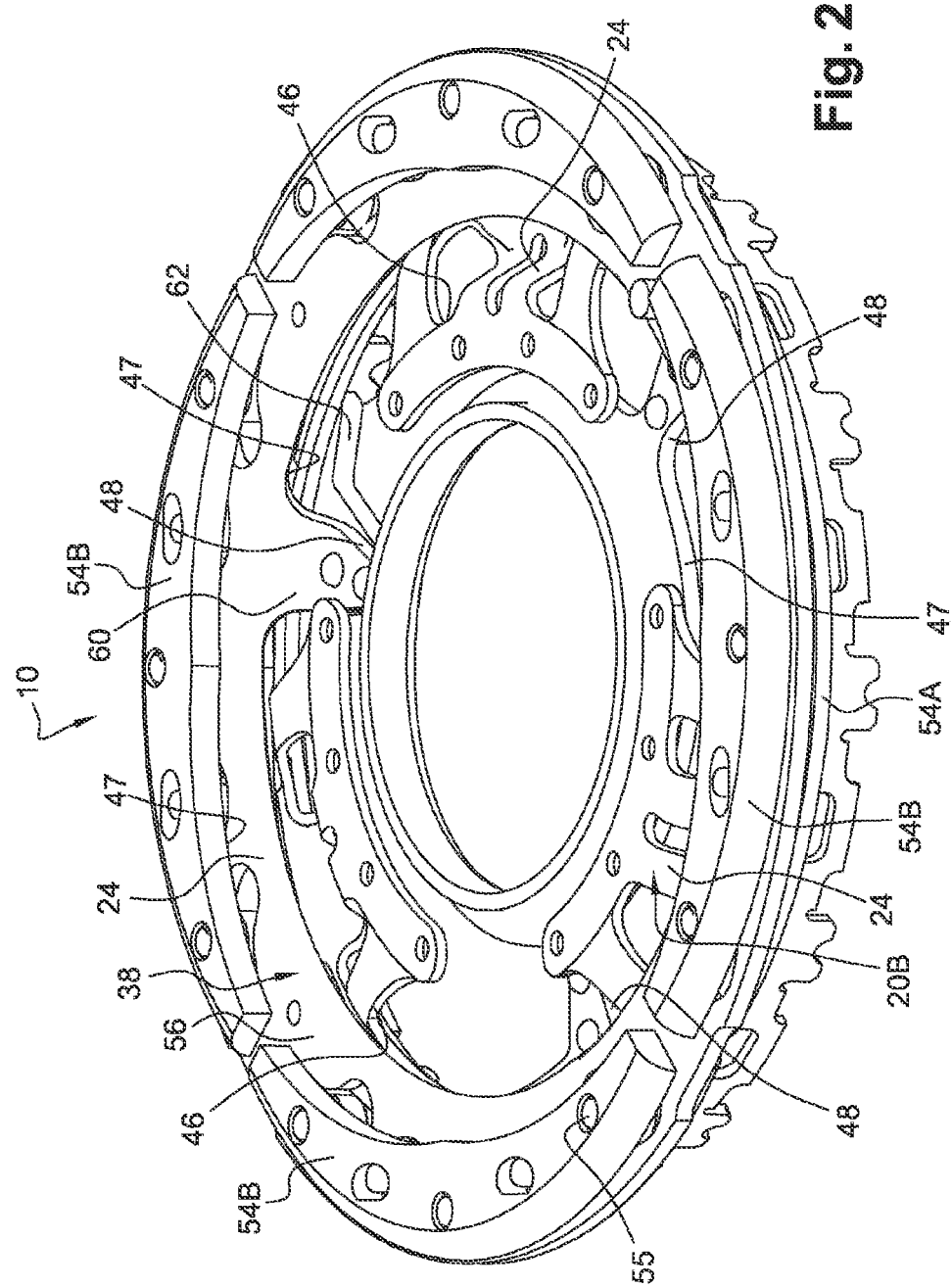
FIG. 2 is a perspective view depicting the phase washer of the device of FIG. 1.
Figure 3:
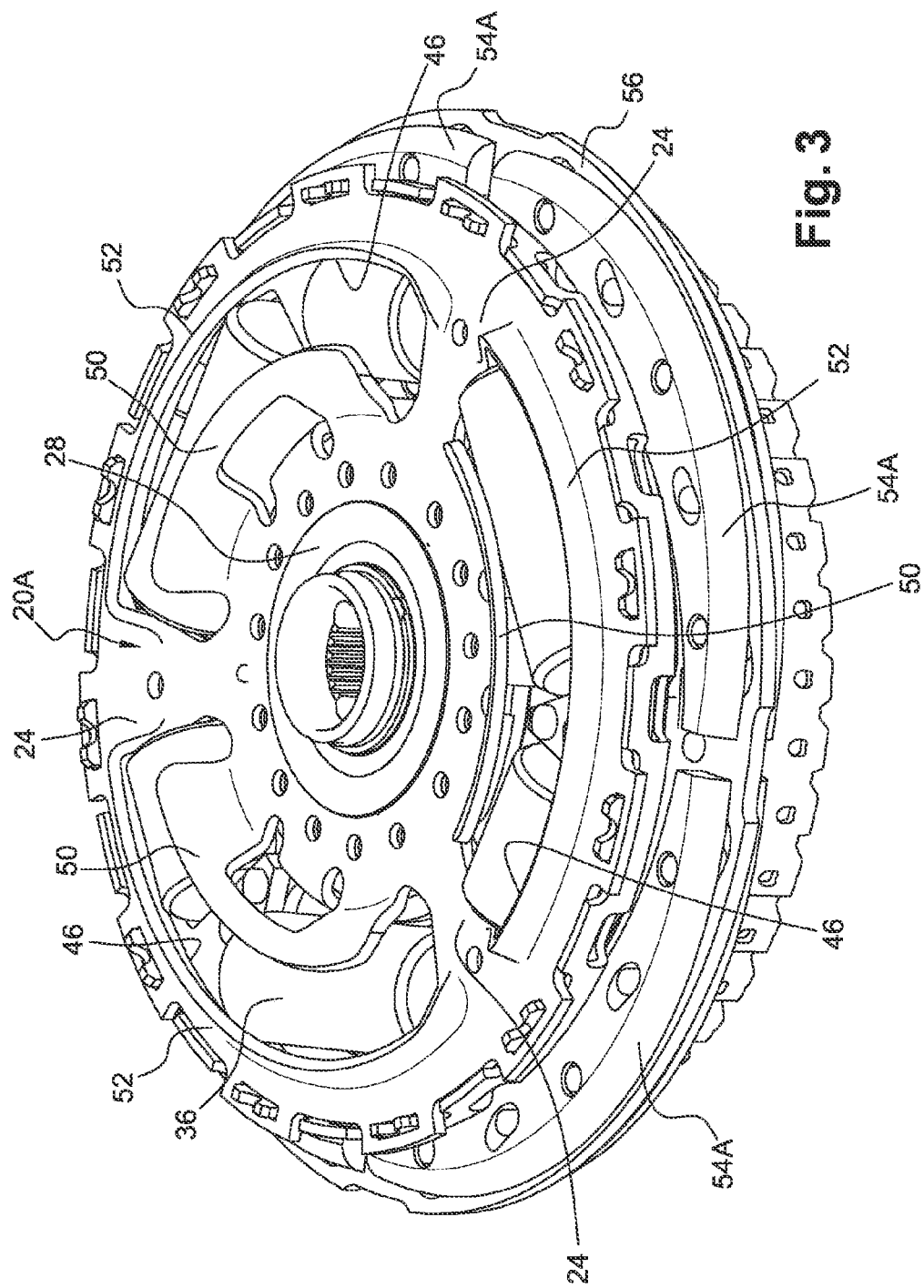
FIG. 3 is a perspective view depicting the damping device of FIG. 1.

As depicted in FIGS. 1 to 3, the damping device 10 additionally has a torque input element rotatable around the rotation axis "B". The torque input element includes a first, front radial input washer 20A and by a second, rear radial input washer 20B, both coaxial with the rotation axis "B". The input washers 20A, 20B are parallel to one another and are arranged axially on either side of the output web 12. The rear input washer 20B is non-rotatably coupled to the front input washer 20A by means of axial pins 21 that are arranged on an outer edge of the rear input washer 20B, as depicted in FIG. 1.

The two input washers 20A, 20B are non-rotatable coupled to the first, drive shaft by means of a splined hub 22, also called a disk carrier, on which is mounted, axially movably, a piston of a clutch "lock-up" system (not depicted). The lock-up piston is movable between a non-bypass position and a bypass position of the converter, allowing the torque converter housing to be coupled to the input shaft of an automatic gearbox. The splined hub 22 is arranged behind the damping device 10. The rear input washer 20B is fastened to the splined hub 22 by means of rivets (not depicted).

Each input washer 20A, 20B has a radial flange that is provided with a central passage to allow passage of the driven shaft and of driven hub 14 of output web 12.

As depicted in FIGS. 2 and 3, each input washer 20A, 20B furthermore has three outer thrust tabs 24 that are arranged in register with the tabs of output web 12. The tabs of output web 12 are thus interposed axially between tabs 24 of front input washer 20A and rear input washer 20B.

When the two input washers 20A, 20B are assembled, their flanges are spaced a sufficient axial distance apart to allow output web 12 to rotate between the two input washers 20A, 20B.

Front input washer 20A is mounted freely rotatably on a first outer cylindrical guidance face 26 of a central bearing 28. Bearing 28 is itself mounted rotatably on an outer cylindrical face 30 of a front segment of driven hub 14. The axial displacements of bearing 28 are limited rearward by a shoulder face 32 of driven hub 14, while they are limited axially frontward by a snap ring 34 that is mounted in a groove of driven hub 14.

In the example depicted in the Figures, input washers 20A, 20B and splined hub 22 are moreover centered with respect to driven hub 14 by means of a radial sheet-metal plate 57 depicted in FIG. 4. Said plate 57 is sandwiched axially between splined hub 22 on the one hand and rear input washer 20B on the other hand. Plate 57 is fastened to splined hub 22 by riveting. Plate 57 has a central orifice whose periphery becomes braced radially against a supporting surface 59 formed by the hub, in order to effect centering of splined hub 22 and of input washers 20A, 20B.

Damping device 10 furthermore has circumferentially acting elastic members 36. In a non-limiting manner, damping device 10 here has six elastic members 36. Elastic members 36 are constituted here by helical springs having a circumferentially oriented principal axis.

As is visible in FIG. 3, elastic members 36 are arranged in one circular row around peripheral edge 18 of output web 12. In other words, elastic members 36 are here installed on a circle centered on rotation axis "B".

Elastic members 36 are distributed into three groups of two elastic members 36. The elastic members 36 of each group are housed circumferentially in series, i.e. end to end, between two tabs of output web 12 and between two tabs 24 of input washers 20A, 20B.

Because the two elastic members 36 of each group are mounted in series, the two facing ends of these two elastic members 36 are capable of becoming braced against one another during transmission of a torque between input washers 20A, 20B and output web 12.

Guidance and axial position retention of elastic members 36 is achieved by guide washers. The guide washers are constituted here by input washers 20A, 20B.

Input washers 20A, 20B are arranged axially on either side of elastic members 36.

Each input washer 20A, 20B is perforated by three windows 46, each of which is arranged in register with two associated elastic members 36, as depicted in FIGS. 2 and 3. Windows 46 are separated by radial tabs 24. Each window 46 is capable of accommodating an axial end portion of elastic member 36.

Each window 46 is bounded
  radially inwardly by an inner lug 50 that extends as far as an inner circumferential edge of window 46, and
  radially outwardly by an outer lug 52 that extends as far as an outer circumferential edge of window 46.

Lugs 50, 52 constitute axial retention means for the associated elastic member 36.

Windows 46 thus constitute receptacles for receiving elastic members 36, and lugs 50, 52 prevent elastic members 36 from coming out axially through windows 46. Elastic members 36 are thus captured axially between the two input washers 20A, 20B.

As depicted in the Figures, each input washer 20A, 20B, thus constituting guide washers, has a peripheral annular portion 53A, 53B in the form of a radial band that extends radially outward as far as the outer edge of windows 46.

Outer lug 52 of windows 46 of front input washer 20A extends in an axially projecting manner forward with respect to peripheral portion 53A, while outer lug 52 of windows 46 of rear input washer 20B extends in an axially projecting manner rearward with respect to peripheral portion 53B.

In order for elastic members 36 to be loaded substantially along their principal circumferential axis, it is known to equip damping device 10 with a phasing member.

A phasing member of this kind is constituted here by a radial phase washer 38. As illustrated in FIG. 1, phase washer 38 is interposed between rear input washer 20B and output web 12.

Phase washer 38 is mounted freely rotatably with respect to output web 12 on the one hand, and with respect to input washers 20A, 20B on the other hand.

Phase washer 38 is mounted freely rotatably on a second outer cylindrical face 42 of driven hub 14. Phase washer 38 is thus centered on driven hub 14. Second outer cylindrical face 42 is arranged axially behind first outer cylindrical face 30. Second outer cylindrical face 42 has a diameter greater than that of first outer cylindrical face 30 of driven hub 14.

Phase washer 38 is braced axially rearward against a radial face 44 that is fixed with respect to splined hub 22 or rear input washer 20B. This allows phase washer 38 to be positioned axially with respect to input washers 20A, 20B. In the embodiment depicted in detail in FIG. 4, phase washer 38 is braced against front face 44 of plate 57.

As depicted in FIG. 2, phase washer 38 is perforated by three windows 47 that are separated circumferentially from one another by radial phasing tabs 48. Each window 47 is intended to accommodate two adjacent elastic members 36, each of which belongs to a different group.

As depicted in FIG. 2, a phasing tab 48 of phase washer 38 is interposed circumferentially between the two elastic members 36 in series of each group.

During the operation of damping device 10, elastic members 36 are compressed between thrust tabs 24 of input washers 20A, 20B and the tabs of output web 12, in order to damp abrupt changes in torque. Input washers 20A, 20B rotate through a determined angle around axis "B" with respect to output web 12, causing compression of the two elastic members 36 of each group. Phasing tabs 48 of phase washer 38 transmit the compressive force of one elastic member 36 toward the other. As a result of this compression, phase washer 38 rotates through half the determined angle with respect to input washers 20A, 20B.

Damping device 10 is furthermore equipped with second torsion damping means of the pendulum type. Second damping means of this kind have at least one pair of pendulum flyweights 54A, 54B that are mounted oscillatingly in a radial plane on a support element. The two pendulum flyweights 54A, 54B of one pair are arranged axially opposite one another. The two pendulum flyweights 54A, 54B of each pair are symmetrically identical with respect to a radial plane.

As depicted in FIG. 2, the two pendulum flyweights 54A, 54B of the pair are mounted oscillatingly on phase washer 38, for example by means of axial fastening pegs 55 that are received slidingly in an oblong guidance orifice of phase washer 38. This type of installation is well known and will not be described in further detail below.

Support element 56 is rotationally driven by the engine shaft, before or after damping by elastic members 36.

Support element 56 is constituted here by an outer annular band that is rotationally integral with phase washer 38. Flyweights 54A, 54B are thus subjected to a maximal centrifugal force during the rapid rotation of damping device 10. Support element 56 is embodied here integrally with phase washer 38.

As depicted in FIG. 3, each pendulum flyweight 54A, 54B is in the shape of a plate that extends in a radial plane. Each pendulum flyweight 54A, 54B is curved substantially in a circular arc that extends here over an angle of approximately 85°, so that the outer contour of each pendulum flyweight 54A, 54B conforms to the outer peripheral edge of support element 56.

Pendulum flyweights 54A, 54B of one pair are arranged axially on either side of support element 56. The front pendulum flyweight 54A is thus arranged opposite the front face of support element 56, while the rear pendulum flyweight 54B is arranged opposite the rear face of support element 56.

In the example depicted in FIGS. 2 and 3, damping device 10 has six pairs of pendulum flyweights 54A, 54B that are distributed evenly over the length of annular support element 56 of phase washer 38. Pendulum flyweights 54A, 54B are arranged in a circle around rotation axis "B". Damping device 10 is thus balanced.

Support element 56 is offset axially with respect to the radial phasing tabs 48 in such a way that the two flyweights 54A, 54B of each pair are arranged axially on the same side with respect to phasing tabs 48. In the example depicted in the Figures, support element 56 is offset axially rearward with respect to phasing tabs 48 in such a way that pendulum flyweights 54A, 54B occupy a space located radially outside splined hub 22.

Support element 56 is more particularly arranged axially opposite peripheral portion 53B of rear input washer 20B.

In other words, support element 56 is also offset axially rearward with respect to peripheral portions 53A, 53B of the two guide washers 20A, 20B.

The axial offset of support element 56 is sufficient that the two pendulum flyweights 54A, 54B are offset axially rearward with respect to peripheral portions 53A, 53B of the two guide washers 20A, 20B.

According to a variant of the invention which is not depicted, only the rear flyweight is offset axially rearward with respect to the peripheral portion of the rear input washer. The front flyweight is then arranged radially opposite the peripheral portion of one and/or the other of the input washers.

Radially inner terminal edge 58 of flyweights 54A, 54B is arranged at a radial distance "D1" from rotation axis "B" which is less than the radial dimension "D2" of the assemblage constituted by output web 12 and input washers 20A, 20B.

The axial offset of support element 56 is achieved thanks to an arm 60 that extends at least partially rearward from the outer terminal edge of phasing tab 48, as is evident from FIGS. 1 and 2. Axial arm 60 is thus arranged radially externally with respect to elastic members 36. This arm 60 passes through rear guide washer 20B. That portion of phase washer 38 which carries phasing tabs 48 is thus interposed axially between front input washers 20A and rear input washers 20B, while support element 56 is arranged axially behind peripheral portion 53B of rear input washer 20B.

In the configuration depicted in the Figures, a radially inner part of the flyweights is capable of occupying an open space axially behind rear input washer 20B. At least one flyweight (here rear flyweight 54B) is thus arranged radially opposite the splined hub 22. Front flyweight 54A is here arranged radially opposite outer lug 52 of windows 46.

Damping device 10 according to the invention is thus capable, for a given radial dimension, of having heavier flyweights 54A, 54B than those of a device embodied according to the existing art. This allows the efficiency of the second damping means to be improved without increasing the axial dimension of damping device 10.

Phase washer 38 also has retaining means radially toward the outside of the elastic means. These retaining means are constituted by rims 62 that extend in circumferentially protruding fashion from phasing tabs 48, as is evident in particular from FIG. 2. These rims 62 are carried here by added elements, and are fastened onto phasing tabs 48. Each added element has two opposite rims 62.

As a variant, the retaining means are embodied integrally with the phase washer.

According to a second embodiment of the invention that is depicted in FIG. 5, support element 56 is an added part that is fastened onto an outer terminal edge of phase washer 38. This embodiment makes it possible in particular to test the elastic-member damping means and the pendulum-flyweight damping means independently.

In the example depicted in FIG. 5, support element 56 is fastened by means of a rivet 64.

Figure 6:
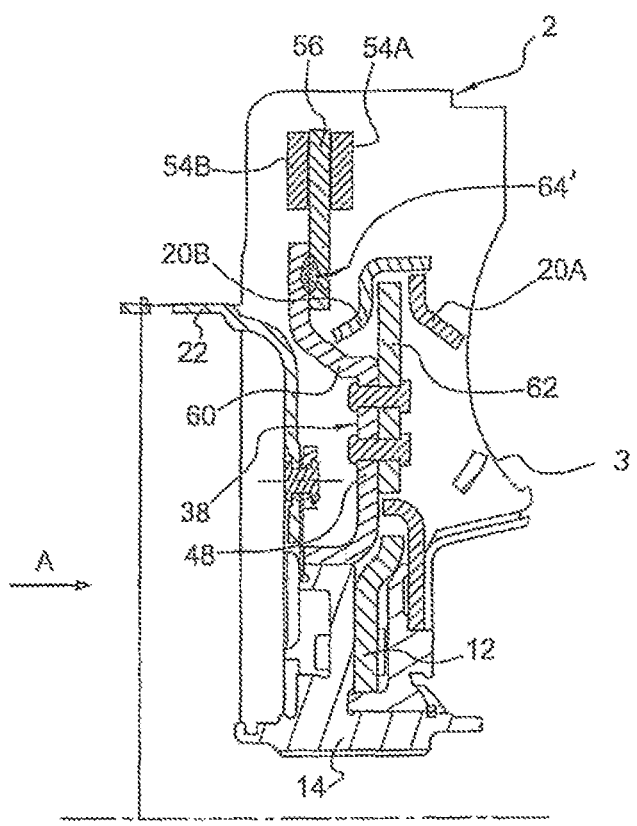
FIG. 6 is a sectioned view similar to that of FIG. 1, depicting a third embodiment of the invention.

As a variant, according to a third embodiment of the invention that is depicted in FIG. 6, the support element 56 is fastened to the phase washer 38 by welding as shown at 64'.

Damping device 10 embodied according to the teaching of the invention thus allows the weight of pendulum flyweights 54A, 54B to be increased without increasing the radial dimension of damping device 10.

The invention claimed is:

1. A torsion damping device (10) rotatable around a rotation axis in an automotive temporary coupling system, the torsion damping device (10) including first and second torsion damping means, the first torsion damping means comprising:
    a torque input element (20A, 20B) and a torque output element (12) mounted rotatably around the rotation axis;
    at least two circumferentially acting elastic members (36) that are interposed circumferentially in series between the torque input element (20A, 20B) and the torque output element (12);
    two radial guide washers (20A, 20B) arranged axially on either side of the elastic members (36), each of the radial guide washers (20A, 20B) having axial retention means (46, 50, 52) for the elastic members (36), each of the guide washers (20A, 20B) having a peripheral portion that extends radially outward from the axial retention means (46, 50, 52); and
    at least one radial phase washer (38) rotatable with respect to the torque input element (20A, 20B) and with respect to the torque output element (12), the phase washer (38) having at least one radial phasing tab (48) that is interposed circumferentially between the two elastic members (36) in series;
    the second torsion damping means comprising:
    at least one pendulum flyweight (54A, 54B) mounted oscillatingly in a radial plane on a support element (56) rotationally integral with the phase washer (38),
    the support element (56) and the at least one pendulum flyweight (54A, 54B) are offset axially on the same side with respect to the peripheral portions of the two guide washers (20A, 20B).

2. The device (10) according to claim 1, wherein the second damping means have at least one pair of flyweights (54A, 54B) that are arranged axially oppositely on either side of the support element (56), the axial offset of the support element (56) being implemented in such a way that the two flyweights (54A, 54B) are axially offset on the same side of the peripheral portions of the two guide washers (20A, 20B).

3. The device (10) according to claim 1, wherein the guide washers (20A, 20B) constitute the torque input element.

4. The device (10) according to claim 1, wherein the support element (56) is integral with the phase washer (38).

5. The device (10) according to claim 1, wherein the support element (56) is an added part that is fastened onto the phase washer (38).

6. The device (10) according to claim 5, wherein the phase washer (38) has at least one axial arm (60) that extends at least partially in the axial direction in order to allow the axial offset of the support element (56) relative to the phase washer (38).

7. The device (10) according to claim 6, wherein the at least one axial arm (60) is arranged radially externally with respect to the elastic members (36).

8. The device (10) according to claim 5, wherein the support element (56) is fastened to the phase washer by riveting.

9. The device (10) according to claim 5, wherein the support element (56) is fastened to the phase washer (38) by welding.

10. The device (10) according to claim 1, wherein the phasing tab (48) has rims (62) for radially retaining the elastic members (36), the rims (62) being carried by an added part that is fastened onto the phase washer (38).

11. The device (10) according to claim 1, wherein the support element (56) is in the form of a ring that extends in a radial plane.

12. A torsion damping device (10) rotatable around a rotation axis in an automotive temporary coupling system, the torsion damping device (10) including first and second torsion damping means, the first torsion damping means comprising:
a torque input element (20A, 20B) and a torque output element (12) mounted rotatably around the rotation axis;
at least two circumferentially acting elastic members (36) that are interposed circumferentially in series between the torque input element (20A, 20B) and the torque output element (12);
two radial guide washers (20A, 20B) arranged axially on either side of the elastic members (36), each of the radial guide washers (20A, 20B) having axial retention means (46, 50, 52) for the elastic members (36), each of the guide washers (20A, 20B) having a peripheral portion that extends radially outward from the axial retention means (46, 50, 52); and
at least one radial phase washer (38) rotatable with respect to the torque input element (20A, 20B) and with respect to the torque output element (12), the phase washer (38) having at least one radial phasing tab (48) that is interposed circumferentially between the two elastic members (36) in series;
the second torsion damping means comprising:
at least one pendulum flyweight (54A, 54B) mounted oscillatingly in a radial plane on a support element (56) rotationally integral with the phase washer (38),
the support element (56) and the at least one pendulum flyweight (54A, 54B) are offset axially on the same side with respect to the peripheral portions of the two guide washers (20A, 20B);
the guide washers (20A, 20B) constitute the torque input element;
a radially inner terminal edge (58) of the flyweights (54A, 54B) is arranged with respect to the rotation axis (B) at a radial distance (D1) that is less than a radial dimension (D2) of an assemblage constituted by the torque input element (20A, 20B) and the torque output element (12).

13. A torque converter having a splined torque input hub (22), the torque converter being equipped with a torsion damping device rotatable around a rotation axis, the torsion damping device (10) including first and second torsion damping means, the first torsion damping means comprising:
a torque input element (20A, 20B) and a torque output element (12) mounted rotatably around the rotation axis;
at least two circumferentially acting elastic members (36) that are interposed circumferentially in series between the torque input element (20A, 20B) and the torque output element (12);
two radial guide washers (20A, 20B) arranged axially on either side of the elastic members (36), each of the radial guide washers (20A, 20B) having axial retention means (46, 50, 52) for the elastic members (36), each of the guide washers (20A, 20B) having a peripheral portion that extends radially outward from the axial retention means (46, 50, 52); and
at least one radial phase washer (38) rotatable with respect to the torque input element (20A, 20B) and with respect to the torque output element (12), the phase washer (38) having at least one radial phasing tab (48) that is interposed circumferentially between the two elastic members (36) in series;
the second torsion damping means comprising:
at least one pendulum flyweight (54A, 54B) mounted oscillatingly in a radial plane on a support element (56) rotationally integral with the phase washer (38), the support element (56) and the at least one pendulum flyweight (54A, 54B) are offset axially on the same side with respect to the peripheral portions of the two guide washers (20A, 20B) in such a way that the at least one pendulum flyweight (54A, 54B) is offset axially on the same side with respect to the peripheral portions of the two guide washers (20A, 20B);
the at least one pendulum flyweight (54A) is arranged radially opposite the splined torque input hub (22);
the splined torque input hub (22) being rotationally integral with the torque input element (20A, 20B).

* * * * *